United States Patent [19]

Rieger

[11] 4,441,407
[45] Apr. 10, 1984

[54] HORIZONTAL CONTAINER FOR PROCESSING WINE GRAPE MUST

[76] Inventor: Herbert Rieger, Talstrasse 33, 7121 Ingersheim, Fed. Rep. of Germany

[21] Appl. No.: 339,302

[22] Filed: Jan. 15, 1982

[30] Foreign Application Priority Data

Jan. 19, 1981 [DE] Fed. Rep. of Germany ....... 3101510
Apr. 18, 1981 [DE] Fed. Rep. of Germany ....... 3115633

[51] Int. Cl.³ .............................................. C12G 1/02
[52] U.S. Cl. .................................................. 99/277.2
[58] Field of Search .................... 99/277.2, 277.1, 277; 366/297, 50, 51, 186, 190, 603

[56] References Cited

U.S. PATENT DOCUMENTS 3,482,821 12/1969 Blackwood .................. 366/186
3,706,442 12/1972 Peat ............................ 366/186
3,804,377 4/1974 Kugle .......................... 366/603
3,910,173 10/1975 Zepponi ...................... 99/277.1

Primary Examiner—Robert W. Jenkins
Attorney, Agent, or Firm—Burmeister, York, Palmatier, Hamby & Jones

[57] ABSTRACT

The invention relates to a horizontal tank-type container, particularly for use in winemaking, the beverage industry and the preparation of alcohol. The upper portion of the container is of a substantially circular cylindrical shape. The invention resides in the container being pear-shaped or escutcheon-shaped in cross section normal to the longitudinal container axis, with the narrow portion pointing downward. This enables the container to be conveniently emptied and easily cleaned.

14 Claims, 6 Drawing Figures

HORIZONTAL CONTAINER FOR PROCESSING WINE GRAPE MUST

FIELD AND BACKGROUND OF THE INVENTION

The invention relates to a horizontally disposed container for the processing of wine grape must. In wineries and other facilities engaged in the crushing, pressing and further processing of wine grapes, large stainless steel tanks are used having capacities of from 2500 to 150,000 liters. Besides the problem of making the best use of the available space, such container are required to be self-emptying to the largest extent possible, so that the least amount of pomace will remain in the tank after completion of the emptying operation, and further, to be easy to clean because the tanks must be in a nearly sterile condition before receiving a fresh charge. If there are any pomace residues left in the tank at the time the tank is refilled, the entire fresh charge in the tank is in danger of failing to produce the required quality, at the least, and oftentimes it may be contaminated completely. The tanks are usually equipped with agitating means, giving rise to the creation of nooks and corners which encourage the buildup of pomace. It is known to provide a discharge screw at the bottom of a horizontal tank to remove all pomace settling on the tank bottom. Since the discharge screw is incapable of covering the entire bottom area, and since the cylindrical tanks are circular in cross-section, a great deal of the pomace settling on flat sections of the tank wall, particularly on the floor, escapes the expelling action of the screw and must be removed by hand.

A solution to the aforementioned problems is particularly difficult in tanks equipped with agitating means. Proposals providing for the highest possible degree of completeness of evacuation of the tank involve a structural complexity which is apt to hamper the cleaning of the tank. For example, if rigid stirring paddles were to be extended to almost touch the inner surface of the tank wall, it might be possible to scrape any pomace off the wall that might have built up there, but some pomace would get stuck between the paddle and the wall and it would be very difficult to remove them by a strong water jet. Moreover, since the tank structure tends to shift somewhat depending on the varying charges, it is alone for this reason not possible to provide but a small space between the paddle end and the inner tank wall. On the other hand, if the distance between the paddle end and the inner tank wall is sufficiently large, a thick layer of pomace tends to settle in the lower half of a conventional cylindrical tank, the thickness of the pomace layer corresponding to the space between the paddle end and the tank wall. Consequently, large quantities of pomace must be removed from the tank during the subsequent cleaning operation.

SUMMARY OF THE INVENTION

It is the object of the present invention to overcome and provide a satisfactory solution to the aforementioned problems.

This is accomplished according to the invention in that the cross section of the horizontally disposed container, normal to its longitudinal axis, is of a shape in which at least one section of the side wall in a region below the largest diameter of the agitator is steeper or narrower than the circular cylindrical wall and extends, in particular, at an angle of at least 30° and up to 70° to the horizontal. If such construction is symmetric with respect to the vertical symmetry plane, the resulting area is pear-shaped or escutcheon or shield-shaped in cross section, assuming that the upper portion of the tank is substantially cylindrical and the narrow portion is pointing downwardly.

The advantage of the invention resides in the relatively steeply sloped inner wall section of the lower container portion, preventing any solids that may have settled on the walls of the lower tank portion from staying there; or at least, the adhering quantities, if any, are far less than in conventional containers. The containers are suitable not only for the processing of wine grape must, but also, with additional equipment if desired, for the distillation of alcohol and for use in the beverage industry. The optional equipment may include draining means or agitating means disposed in the tank, depending on the intended use. Also in these applications, the aforementioned advantages are realized in the removal of the pomace from the tank due to the relative steep walls in the lower tank portion. When the tank is filled with a liquid containing sediment producing components, for example yeast, any settlement of solids on the tank wall is additionally prevented by the increased flow rate of the liquid flowing past the container wall during the last phase of the emptying operation, the increased flow rate being due to the steep wall sections as compared to conventional containers. Out of the aforementioned angular range of 30° to 70°, from which the angle of inclination most suitable for any given purpose may be selected, an angle of about 45° to 60°, or else 55°, is preferred for wine making purposes. In some embodiments of the invention, the container wall in its lower portion may be vertical, whereby this lower portion constitutes a drainage channel at the bottom of the otherwise substantially cylindrical container. The vertical walls will discourage any accumulation of solids thereon.

The relatively steeply inclined section of the side wall may be part of a cylindrical surface or a similarly curved surface. The upper cylindrical portion of the container merges with the more steeply inclined section of the side wall without angular break. This also applies to another embodiment of the invention in which the relatively steep side wall section is substantially straight or plane. The particular advantage is that its construction is facilitated by using flat sheet metal panels.

The tank, as far as its cross sectional configuration is concerned, will in most instances be symmetric about a perpendicularly extending longitudinal median plane.

In one embodiment of the invention, one of the side walls of the container is substantially perpendicular, whereas the other side wall in its lower section extends at an angle with respect to the horizontal and the vertical. The advantage of this construction is that two containers may be placed with their vertical side walls closely adjacent back to back, or may even be placed immediately adjacent each other, so that an especially economical use of the available space is being made.

In one embodiment of the invention, the side walls of the container merge in the bottom region with a wall section that is substantially in the shape of a segment of a circular cylinder and forms a connection between the two side walls. The radius of curvature of this cylindrical wall section is considerably smaller than the radius of curvature of the wall of the upper tank portion. This particular shape is statically beneficial because it prevents the container wall from being exposed to unduly high load stresses during the filling of the container. Also, the drainage channel formed in this manner can easily be cleaned. Finally, the drainage channel is suitable to have a motor driven discharge screw installed therein for expelling the pomace from the container.

The drainage channel may be partly cylindrical in its lower section which may likewise, as described in the foregoing, be provided with a discharge screw or auger.

In one embodiment of the invention, the container is equipped with an agitator. The axis of the agitator may in one embodiment be coaxial with the axis of symmetry or lie in the plane of symmetry of the container, respectively, while in another embodiment the agitator axis is located at a distance from the axis of symmetry or the plane of symmetry, respectively. In the latter case, the distance of the circular path described by the stirring paddles of the agitator from the inner surface of the container wall varies along the peripheral range of the agitator; such distance is smaller in the lower half of the container than in its upper half. This particular embodiment has the advantage that the agitator in the lower container half in the region of the steeper wall section, has the effect of promoting the downward movement of the tank contents (at the proper direction of rotation), so that the contents are moved by the agitator during the evacuation of the tank into the range of a conveyor screw serving to empty the tank.

If the distance between the tips of the agitator paddles, in the region of their closet approximation to the container wall, and the container wall is relatively small, the paddles function simultaneously as scrapers to further counteract any tendency of the pomace to adhere to the container wall. In some embodiments of the invention, this scraping or stripping effect may be present only in one particular area of closet range from the container wall, which area may be determined, for example, by a lateral translation of the agitator axis relative to the vertical symmetry plane of the cross section of the tank.

Because pomace will not settle on the steeper section of the lower container half during emptying, or it may easily be rinsed off as the tank is being cleaned, it is not necessary to worry about removing pomace with the agitator that might have remained on the wall. Rather, the distance between the ends of the stirring paddles and the inner wall surface may be so selected that there will be no or little scraping of the inner wall surface by the paddles. However, if the distance between the paddle tips and the wall is relatively large, the tank wall as well as the paddles can easily be cleaned by means of a sharp water jet after the evacuation of the tank.

Nevertheless, an eccentric positioning of the agitiator may also have its advantages in the case where the agitator extends into the region of the steeper container sections according to the invention. Not infrequently, a bridge of firmly agglomerated pomace solids is forming above the discharge screw, particularly, when the screw has not already been put into operation during the dejuicing process. The farther the mixing paddles reach down and, hence, the smaller the distance is between the circular path of the mixing paddles and the conveyor screw, the smaller is the tendency for pomace to form a solid bridge above the conveyor screw. The flatter the slope is of the inclined sections, the smaller may be the distance of the paddle orbit from the discharge screw and the thinner will be the layer of pomace, if any, forming above the screw. The steeper the slope of the inclined sections is, however, the greater is the smallest possible distance between the paddle orbit and the discharge screw and the thicker may be the bridge of pomace building up above the screw; however, the tendency toward bridge formation decreases with the increasing tendency of the pomace to slide more readily down the steep slopes into the range of the screw. In one embodiment of the invention, the angle of inclination of the steep sections is from 45° to 52°. This has been found to be a very good compromise in actual practice.

In containers, whose height is not much greater than their maximum width, it may be sufficient to provide only one agitator capable without difficulty to serve nearly the entire contents of the tank.

In containers which are of considerable height in proportion to their width, more than one agitator may be called for, according to another embodiment of the invention, with the axes of the agitators being substantially parallel. This makes it possible that also in such relatively slender tanks the major portion or nearly the entire volume of the tank can be covered by the agitators.

If a plurality of agitators are provided, the distance between two adjacent agitator axes is at least equal to the sum of the radii of the two agitators, according to one embodiment of the invention. This precludes any possibility of a collision between the agitators and it is thus possible to operate the two agitators at different speeds, depending on the prevailing situation, or even to stop one of the agitators without the need for precautionary safety measures and to merely run the other agitator as, for example, when the tank is only half filled.

According to yet another embodiment of the invention, the distance between two adjacent agitator axes is smaller than the sum of the agitator radii of the two agitators, and the drive means of the two agitators are adapted to be coupled free of slippage.

BRIEF DESCRIPTION OF THE DRAWINGS

Further objects and advantages of the invention will become apparent from the following description of exemplary embodiments of the invention with reference to the accompanying drawings illustrating the inventive features, and from the claims. The individual features may be materialized each by itself or in any combination in any particular embodiment.

In the drawing.

DETAILED DESCRIPTION OF THE ILLUSTRATIVE EMBODIMENTS

Figure 1:
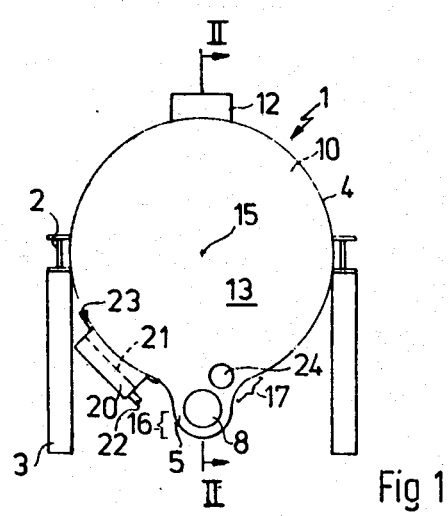
FIG. 1 is a front view of a first embodiment of a container according to the invention.
Figure 2:
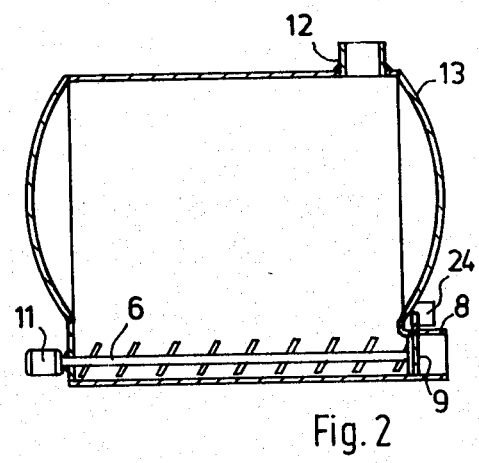
FIG. 2 is a sectional view of the container of FIG. 1, taken along the line II—II.

FIGS. 1 and 2 show a container or tank 1 being substantially circular-cylindrical in cross section and having a horizontal longitudinal axis, that is, the container is horizontal in attitude. The container is supported on the floor by upright elements consisting of studs 2 and columns 3. The bottom portion of the circular cylindrical shell 4 of the container 1 is provided with an approximately trough-shaped drain or channel 5 extending the entire length of the container and having disposed therein a discharge auger or conveyor screw 6, by means of which the less flowable constituents of the tank contents are discharged through a discharge neck 8 as an extension of the conveyor screw 6 when a gate 9 is opened which is only intimated in the drawing. The conveyor screw 6 is operated by drive means disposed at the far side from the discharge neck 8 and extending past the rear wall 10 of the container 1 in the illustrated embodiment, such drive means consisting of an electric motor 11. The conveyor screw 6 is positioned outside the circular cylinder constituted in its major portion by the shell 4. The container top is provided with an inlet opening 12. The container front wall 13 is arcuately curved. The axis of the cylindrical surface formed by the shell 4 is designated 15. In other embodiments of the invention, the conveyor screw 6 may extend into the circular cylinder.

The discharge drain 5 is defined in its lower region 16 by a semi-cylindrical surface. Between the bottom portion 16 and the cylindrical portion of the shell 4 the section of the container wall designated 17 is curved inversely to the shell 4 and has in this area, as also in the adjacent area of the lower region, an inclination with respect to the horizontal which is greater than the slope of the shell 4 immediately adjacent and above. the various sections of the container wall, including the drain 5, merge smoothly into each other without angular breaks.

In the illustration of FIG. 1, near the lowermost section of the cylindrical shell 4 and to the left of the drain 5, a juice receptacle or pan 20 is provided in a depression in the shell 4. The juice pan 20 extends over a considerable part of the length of the container 1. In its interior, spaced from the cylindrical surface of the shell 4, the juice pan 20 is provided with a slotted plate 21 permitting the juice to pass through but retaining the pomace. The juice is discharged from the juice pan 20 through an outlet port 22 and flows off through suitable conduits. In view of the juice receptacle of the container shown in FIGS. 1 and 2, this particular tank is used to advantage in the processing of red wine grape must by affording the juice what is called "free run". Using the container 1 of FIGS. 1 and 2 merely as a storage tank, for example for wine, the juice pan 20 obviously is not required. In that case, a discharge port 24 is provided in the front wall 13. This port 24 is located, in a manner known per se, above the lowest point o f the container so that the solids settling on the container bottom may be removed separately by opening the gate 9. If no considerable quantities of solids are expected, the conveyor screw 6 may be dispensed with.

The next figures illustrate substantially only the cross-sectional configurations of a horizontally disposed container having a conveyor screw installed in its bottom portion, according to practical requirements.

Figure 3:
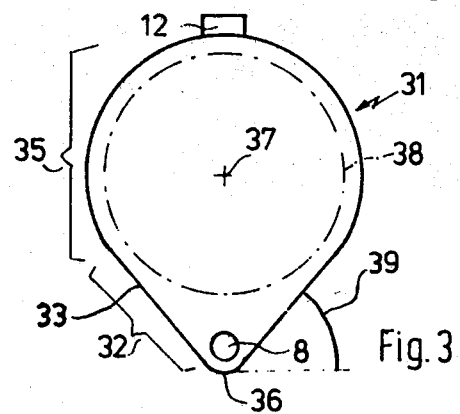
FIG. 3 is a view, similar to FIG. 1, of another embodiment of a container according to the invention.

The mirror image symmetric container 3 of FIG. 3 is provided in its lower portion 32 with a substantially plane or straight side wall 33, whereas its upper portion 35 is circular cylindrical in shape. The circular cylindrical surface is emcompassed by an angle in excess of 180°. The plane wall sections 33 in the region 32 are oriented at an angle 39 of approximately 50° with respect to the horizontal. The bottom ends of the plane wall sections 33 are joined by a wall section 36 in the shape of a circular segment, merging with the straight wall sections 32 without a break. Again, there is indicated the discharge neck 8. The outlet port 24 has been omitted from the drawing for simplicity. If desired, centrally arranged agitator means having a horizontal axis of rotation 37 may be installed in the tank 31, as indicated by the dash-dotted circular line 38 as described by the extreme ends of the agitator blades. Similar to the container 1, container 31 may likewise have installed in its bottom portion a conveyor screw 6 whose diameter and distance from the agitator is determined by the angle formed by the two wall sections 33 and the requirement that the screw 6 be positioned as close to the bottom 36 as possible.

Figure 4:
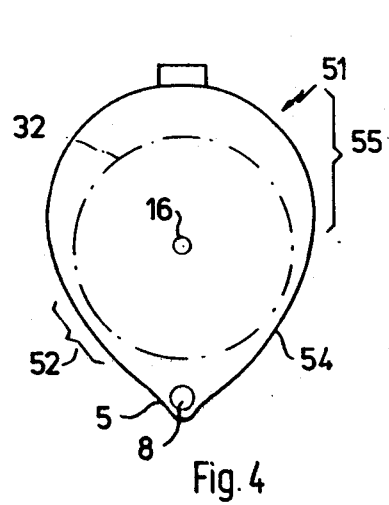
FIG. 4 is a similar view of yet another embodiment of a container.

The container 51 shown in FIG. 4 is symmetric in cross section relative to the vertical plane of symmetry of the container. Its side wall 54 in the region of the lower container half is steeper than an extrapolation of the approximately semi-cylindrical cross section of the upper half 55 normally would be. The shaft 16 of the agitator is disposed in the mentioned vertical plane of symmetry approximately midway between top and bottom of the container 51 and below the axis of symmetry of the cylindrical portion 55. The zone of the smallest distance between the peripheral range 32 of the agitator and the side wall 54 is designated 52. The smallest distance may be from 5 mm to 150 mm. The conveyor screw, not visible in FIG. 4, is positioned in the drain 5 in the bottom portion of the container 51 in rear of the discharge neck 8, in similar fashion as in container 1 described above. The side wall 54 is part of a cylindrical surface having a radius of curvature which is greater than the radius of curvature of the section 55. The angle of inclination of the wall section 54 with respect to the horizontal may have a median value of, for example, about 50°. The drain or channel 5 is not as articulate as in the container of FIG. 1, so that it is difficult for pomace to accumulate on the very steep slope 54.

The cross sections of the containers 31 and 51 may be termed approximately pear-shaped or shield-shaped or escutcheon-shaped.

Figure 5:
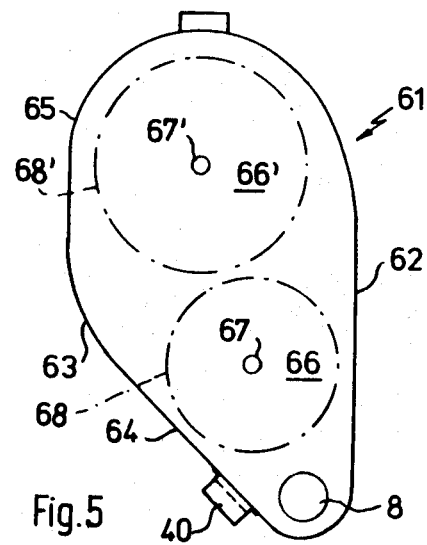
FIG. 5 illustrates an embodiment of an unsymmetric container.

In the container 61 illustrated in FIG. 5, the right hand side wall 62 is largely vertical. The opposite side wall 63 has a lower section 64 which is inclined at an angle of about 45° with respect to the horizontal. This wall section merges at a level of about one half of the height of the container into an approximately semi-cylindrical section 65 which in turn connects with the vertical wall section 62.

The bottom region again may hold a conveyor screw in rear of the discharge neck 8. In the space above, two agitators 66 and 66' are installed, each having a horizontal axis 67 and 67', resp. The diameter of the lower agitator 66 and the positioning of its shaft 67 are so selected that there is only a small space between the peripheral range 68 of the agitator and the neighboring side walls. The diameter and the positioning of the upper agitator 66' are such as to preclude any collision with the agitator 66 and to largely fill the upper space of the container 61. The agitator shafts 67 and 67' are linked by drive means, not illustrated, enabling the agitators 66 and 66' to be driven in the desired direction of rotation and at the desired speed. If needed, only one of the agitators may be operated. The side walls 62 and 64 are joined to each other at the container bottom by a cylindrical wall section. The containers may be made of steel, particularly of corrosion resistant stainless steel, or of a suitable plastic material. The front and rear walls of the container may be slightly curved for reasons of stability; these curvatures have been omitted from the drawings for the sake of simplicity.

The floor of the approximately trough-shaped drain 5 shown in a sectional view in FIG. 2 is represented as being horizontal. Depending upon conditions, however, the drain or the cylindrical wall section in the container bottom may be sloping in the longitudinal direction toward the discharge neck 8. This causes the flow rate of the discharging fluid to increase during the emptying operation, thus contributing further to preventing solids from settling on the container surfaces.

Figure 6:
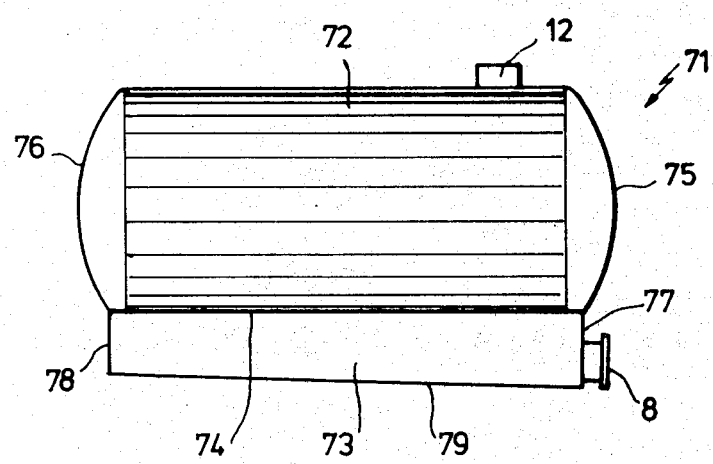
FIG. 6 is a side view of still another embodiment.

FIG. 6 is a side view of a container 71, the side wall 72 of which being largely cylindrical. The lower section merges into straight or plane wall sections 73, similar to the container of FIG. 3, the difference being that in the container 71 the wall sections 73 are joined to the circular cylindrical side wall 72 at an inwardly directed angular bend. The front wall 75 and the rear wall 76 are curved outwardly over the major portion of their surface areas to achieve statically favorable load conditions. In the lower region, however, the walls 75 and 76 merge into vertical wall sections 77 and 78, resp., which simultaneously function as the end walls of the discharge drain formed by the wall sections 73. The front wall 77 is provided with the discharge neck 8. The underside 79 of the discharge drain formed by the wall sections 73 extends at a slight incline toward the discharge neck 8. In the embodiment illustrated in FIG. 6, the vertical wall sections 77 and 78 are prohibitive of any buildup of solids or thick heavy matter in these regions. The tendency of material settling in the regions of the walls 75 and 76 would be much greater if the walls 75 and 76 were to extend all the way down to the container bottom at the curvature illustrated. If the relatively steep side walls and end walls encompass a relatively large surface area, as it is the case in the illustrated embodiment, the pomace as residue of the grape must, if that is the content of the container, will not cling to the walls as the tank is emptied, but will slide or drop, without the assistance of an agitator, into the discharge drain from where it can be removed from the tank by a conveyor screw, not shown in FIG. 6.

In the embodiments described in the foregoing, in which the container side walls having different degrees of curvature, which shall be understood to also include level side walls, merge into one another without an angular break, such break may be provided at the point or line of transition, if required by special conditions.

The juice receptacles 20 of some embodiments of the invention are preferably positioned in the region of the plane steep surface areas 33.

The inclined surfaces may project upwardly into the cylindrical portion 72 a distance approximately equal to 20% of the diameter of the cylindrical portion. This applies also to the walls 77 and 78.

I claim:

1. A wine tank for stationary use in a winery, said tank comprising
    an upper tank portion corresponding substantially in shape to a major portion of a circular cylinder having a substantially horizontal axis,
    stationary supporting means for supporting said tank in a stationary position with said axis substantially horizontal,
    a lower tank portion of a substantially tapered form and having a pair of side walls connecting smoothly with said upper tank portion and extending downwardly therefrom while converging toward each other,
    said side walls ranging from zero curvature to a slight curvature having a radius of curvature which is substantially greater than the radius of curvature of said upper tank portion,
    each of said side walls extending downwardly at an angle of at least 30° relative to the horizontal,
    and a bottom wall portion substantially in the form of a circular cylindrical segment into which the lower portions of said side walls merge,
    said bottom wall portion being connected between the lower portions of said side walls and constituting a discharge drainage trough,
    said downward angle of at least 30° of said side walls being sufficiently great to cause discharge of wine pomace by gravity while minimizing the accumulation of wine pomace on said side walls.

2. A wine tank according to claim 1, in which said side walls are in the shape of sloping, downwardly coverging planes.

3. A wine tank according to claim 1, in which said wine tank is substantially symmetrical about a vertical longitudinal median plane,
    said side walls having sloping angles ranging from 30° to 70°.

4. A wine tank according to claim 1, in which one of said side walls is substantially vertical, the other side wall sloping downwardly at an angle 30° to 70°.

5. A wine tank according to claim 1, including a conveyor screw disposed in said drainage trough formed by said bottom tank bottom.

6. A wine tank according to claim 1, including a rotary agitator rotatably mounted in said tank.

7. A wine tank according to claim 6, in which the rotary axis of said agitator is substantially coaxial with the circular cylindrical axis of said upper tank portion.

8. A wine tank according to claim 6, in which the rotary axis of said agitator is spaced away from the circular cylindrical axis of said upper tank portion.

9. A wine tank according to claim 6, in which the rotary axis of said agitator is spaced below the circular cylindrical axis of said upper tank portion.

10. A wine tank according to claim 1, including a plurality of rotary agitators rotatably mounted in said tank, said rotary agitators being disposed at different elevations in said tank and with the rotary axes of said agitators substantially parallel.

11. A wine tank according to claim 10, including two of said rotary agitators having parallel rotary axes which are spaced apart by a distance which is greater than the sum of the radii of the two agitators.

12. A wine tank according to claim 1, in which the sloping angles of said converging side walls range from 45° to 55°.

13. A wine tank according to claim 1, including a juice receptacle connected to said tank along one of said sloping side walls.

14. A wine tank for stationary use to hold grape must in a winery, said tank comprising
    an upper tank portion corresponding substantially in shape to a major portion of a circular cylinder having a substantially horizontal axes,
    stationary supporting means for supporting said tank in a stationary position with said axis substantially horizontal,
    a lower tank portion of a substantially tapered form and having a pair of side walls connecting smoothly with said upper tank portion and extending downwardly therefrom while converging toward each other, said side walls being in the form of converging planes, each of said side walls being at an angle of at least 45° relative to the horizontal to cause the discharge of wine pomace along said side walls by gravity while minimizing the accumulation of wine pomace on said side walls, a bottom wall portion substantially in the form of a circular cylindrical segment into which the lower portions of said side walls merge, said bottom wall portion being connected between the lower portions of said side walls and constituting a discharge drainage trough, juice outlet means connected to said tank along one of said side walls, a rotary conveyor screw rotatably mounted in said trough for conveying and discharging wine pomace toward one end of said trough, a selectively openable opening at said one end of said trough for discharging the wine pomace therefrom, power drive means connected to the opposite end of said rotary conveyor screw for rotating said screw, and a rotary agitator rotatably mounted in said upper tank portion and having a rotary axis coinciding generally with the axis of said circular cylinder.

* * * * *